Figure 1:
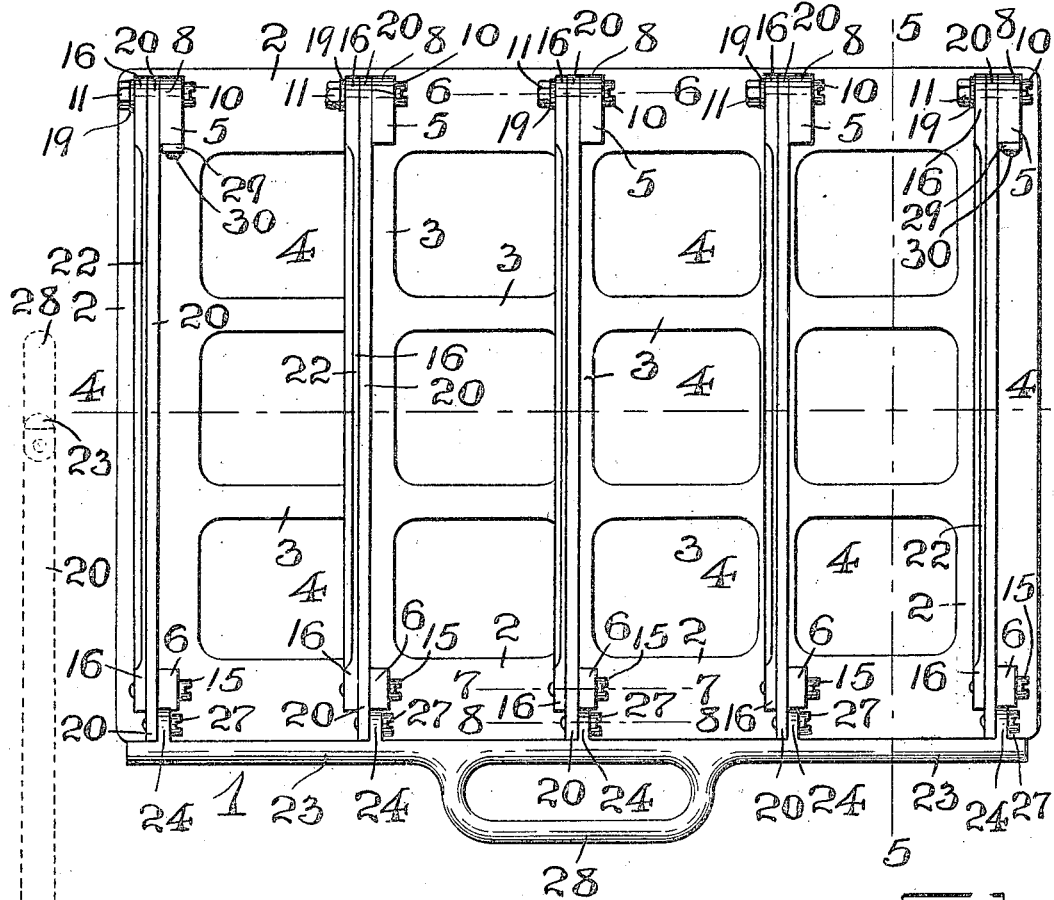

J. I. COLLEY.
CURRENCY CUTTING OR SHEARING MACHINE.
APPLICATION FILED FEB. 9, 1909.

949,462.

Patented Feb. 15, 1910.

WITNESSES:

INVENTOR:
John I. Colley,
BY
Fraentzel and Richards,
ATTORNEYS

J. I. COLLEY.
CURRENCY CUTTING OR SHEARING MACHINE.
APPLICATION FILED FEB. 9, 1909.
949,462.
Patented Feb. 15, 1910.
2 SHEETS—SHEET 2.
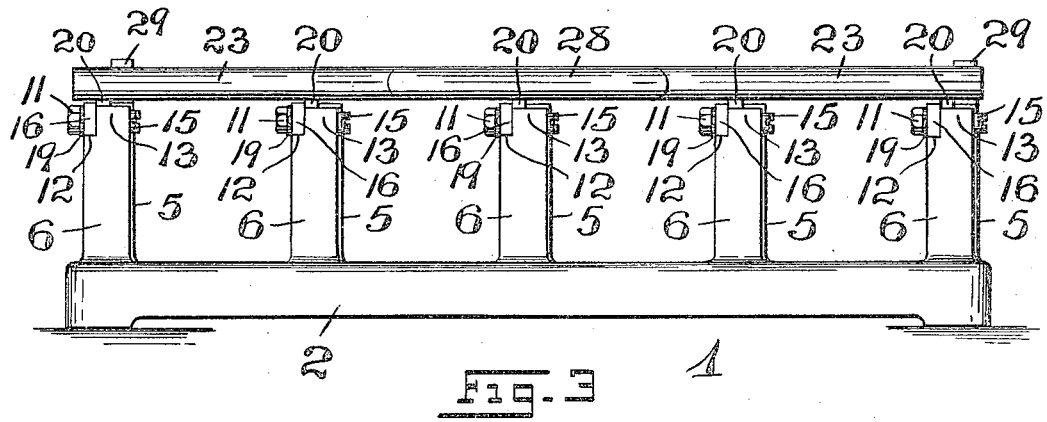
Fig. 3
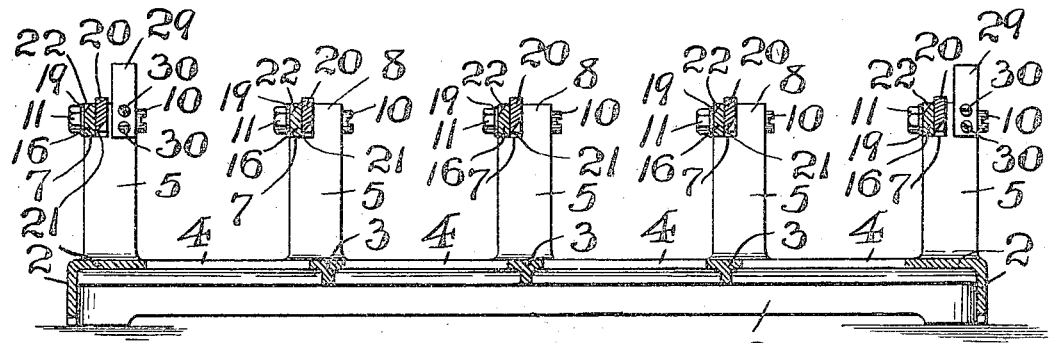
Fig. 4
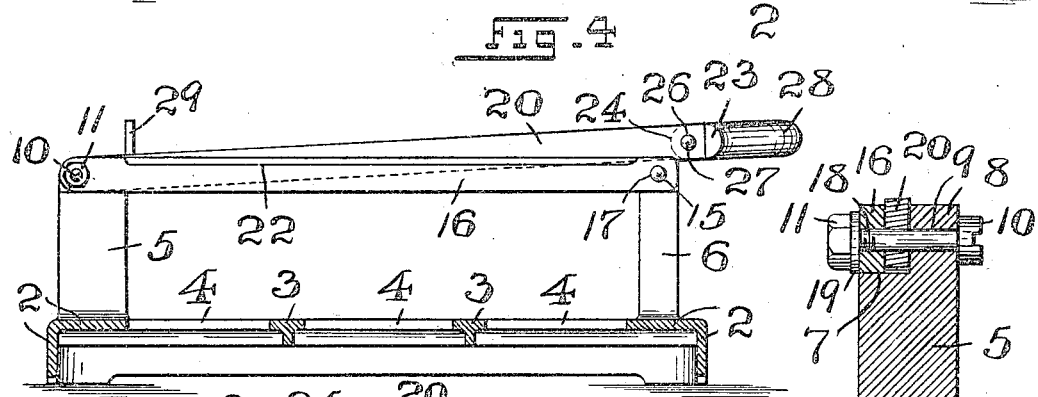
Fig. 5    Fig. 7    Fig. 6
Fig. 8
WITNESSES:
Fred'k H. W. Fraentzel.
Anna H. Aiter.
INVENTOR:
John I. Colley,
BY
Fraentzel and Richards,
ATTORNEYS

UNITED STATES PATENT OFFICE.

JOHN I. COLLEY, OF SOUTH BETHLEHEM, PENNSYLVANIA.

CURRENCY CUTTING OR SHEARING MACHINE.

949,462. Specification of Letters Patent. Patented Feb. 15, 1910.

Application filed February 9, 1909. Serial No. 476,903.

*To all whom it may concern:*

Be it known that I, JOHN I. COLLEY, a citizen of the United States, residing at South Bethlehem, in the county of Northampton and State of Pennsylvania, have invented certain new and useful Improvements in Currency Cutting or Shearing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in cutting or shearing machines or devices; and, the present invention has reference, more particularly, to a novel machine or apparatus which is especially adapted for use in banks for the purpose of cutting sheets of currency, as they are furnished to the banks from the government printing office, into separate bills, the device comprising a multiplicity of cutters or shears which will sever the sheet or sheets of currency on lines between the printed bills, and simultaneously therewith will also sever or cut off the longitudinal edges of the bills located at the outer longitudinal edges of the sheet.

My present invention, therefore, has for its principal purpose to provide an efficient and simply constructed cutting or shearing machine of the general character hereinafter more fully set forth which will positively and quickly accomplish the results herein-above stated, and which may also be employed for cutting other sheets, bearing upon the face thereof an arrangement of pictures, and other printed matter, as for instance in the case of bank-checks, cards, and the like, into individual pieces.

A further object of this invention is to provide in addition to a cutting or shearing machine of the character herein specified, a suitable gage or gages, so that the sheet of currency, or the like, may be readily and properly located upon the frame-work of the device, in order that the cut and trimmed bills, or other individual sections of the sheet, will all be of the same size and shape.

Other objects of this invention not at this time more particularly enumerated will be clearly understood from the following detailed description of the said invention.

With the various objects of the present invention in view, the said invention consists, primarily, in the novel cutting or shearing machine of the general character hereinafter set forth; and, the invention consists, furthermore, in the arrangements and combinations of the various devices and parts, as well as in the details of the construction of the same, all of which will be more fully described in the following specification, and then finally embodied in the clauses of the claim which are appended to and which form an essential part of the said specification.

The invention is clearly illustrated in the accompanying drawings, in which:—

Figure 2:
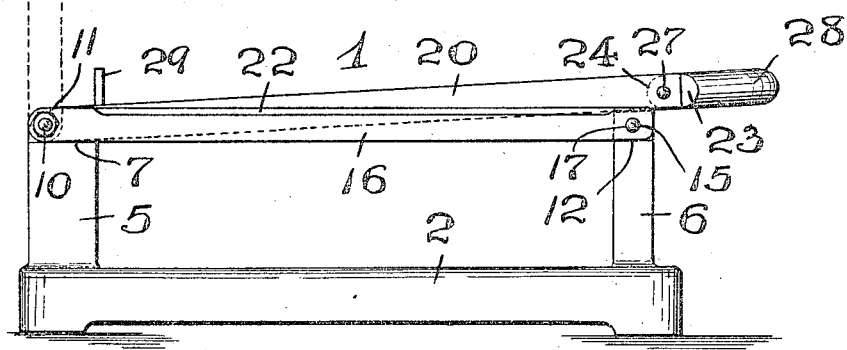

Figure 1 is a top or plan view of a cutting or shearing machine illustrating one embodiment of my present invention; and Fig. 2 is a side elevation of the same. Fig. 3 is a front elevation of the machine; Fig. 4 is a vertical section of the machine, said section being taken on line 4—4 in said Fig. 1; and Fig. 5 is a transverse sectional representation of the machine, said section being taken on line 5—5 in said Fig. 1. Fig. 6 is a detail vertical section, taken on line 6—6 in said Fig. 1; Fig. 7 is a similar section, taken on line 7—7 in said Fig. 1; and Fig. 8 is a similar section, taken on line 8—8 in said Fig. 1, all of said sections being made on enlarged scales.

Similar characters of reference are employed in all of the above described views, to indicate corresponding parts.

Referring now to the several figures of the drawings, the reference-character 1 indicates one form of complete cutting or shearing machine embodying the principles of my present invention, the same comprising a suitable base or bed-plate, as 2, which as will be evident may be formed with suitably disposed webs or braces 3, so as to form suitable open portions, as 4, for the purposes of greatly reducing the weight of the said base or bed-plate, and at the same time cheapening the cost of construction.

Extending upwardly from the said base or bed-plate are a series of posts 5, the said posts preferably forming an integral part of the said bed-plate. Other upwardly extending posts 6 are also provided, said posts 6 also preferably forming an integral part of the said bed-plate or base 2. The said posts 5 are provided at their upper end-portions with suitable cut-away parts, as 7, which form off-sets, substantially as shown, the parts 8 of said posts being provided with laterally extending holes 9 in which are arranged bolts 10 provided with nuts 11. The posts 6 are also provided at their upper end-portions with suitably cut-away parts, as 12, which form off-sets, substantially as shown, the parts 13 of said posts 6 being provided with laterally extending holes 14, which are screw-threaded to receive suitable screws or bolts 15. Resting upon each pair of off-sets of the posts 5 and 6, and connecting each rear post 5 with a front post 6, is a supporting bar 16, the screw-threaded shank of each screw 15 being screwed into a screw-threaded hole 17 in the front end-portion of each bar 16, so as to firmly secure and fix each bar 16 against a part 13, as clearly indicated in Fig. 7 of the drawings. The rear end-portion of each bar 16 is made with a hole 18, into and through which the screw-threaded shank of a bolt 10 extends with the ends of said bolts projecting from the sides of the bars 16 for the reception of suitable washers 19 and the previously mentioned nuts 11 upon said bolts 10, in the manner more particularly illustrated in Fig. 6 of the drawings. Oscillating upon the said bolts, between the faces of the parts 8 of the said posts 5 and the side-faces of the rear end-portions of said bars 16 are suitably formed bars 20, said bars having their lower edges ground and sharpened, as at 21, to provide cutting or shearing edges, substantially as shown in Fig. 4 of the drawings. The upper edge-portions of the said bars 16 may also be chambered, as at 22, as shown in said Fig. 4, against and along which and the flat surface-portions of said bars, nearest the bars 20, the shearing or cutting edges 21 of said bars 20 can be moved in shearing or cutting engagement, according to the proper adjustment of said nuts 11 upon the screw-threaded parts of the shanks of the respective bolts 10.

The reference-character 23 indicates a front-bar or plate which is provided at suitable intervals with rearwardly extending lugs or fingers 24. Each lug or finger 24 is made with a hole 25 and is adapted to be fitted against the side of the front end-portion of a bar 20, as illustrated in Fig. 8 of the drawings, the said end-portions of the bars 20 being provided with screw-threaded holes 26 which register with the holes 25 of said lugs or fingers 24. Suitable screws 27 are employed for rigidly attaching the lugs or fingers 24 of said bar or plate 23 to the front end-portions of the bars 20, substantially as shown in the figures of the drawings.

From the foregoing description it will be clearly seen, that I have thus provided a suitable shearing or cutting device which comprises a multiplicity of shears or cutters, each shear or cutter being adapted to be moved along the shearing edge and side of a bar 16.

To readily produce the oscillatory movements of the said shearing or cutting device, the said bar or plate 23 is provided with a suitably shaped member or element, as 28, which provides a fingerpiece or handle by means of which the front portion of the said shearing or cutting device can be raised and lowered, and the rear end-portions of the bars 20 made to oscillate upon the respective pins or bolts 10 of the posts 5.

As shown in the several figures of the drawings, suitably formed gages, as 29, may be secured by means of screws 30, or other suitable fastening means, to some of said posts 5, each gage 29 having its upper part projecting above the horizontal plane of the upper edges of the said bars 16, as clearly indicated in Fig. 2 of the drawings.

When it is desired to use the machine or apparatus to cut up a sheet or sheets of currency into separate and individual bills all of the same size, or for other cutting or shearing purposes, the previously described cutting or shearing device, by means of its fingerpiece or handle 28, is raised so as to assume a position as indicated in the dotted outline in said Fig. 2. A sheet or sheets of currency, is then placed upon the upper edges of the supporting bars 16, with the one marginal edge of the sheet or sheets placed against the gages 29, for properly squaring the sheet or sheets. The cutting or shearing device is then lowered by means of its finger-piece or handle, whereby the cutters or shears 20 are forced through the sheet or sheets, and, as will be evident, the sheet or sheets will be severed into the various bills of currency, and all bills will be properly trimmed and all of them are uniform in shape and size.

The downward movement of the cutting or shearing device is limited and arrested by the engagement of the front end-portions of the pivoted or oscillatory shearing or cutting bars 20 with the upper ends of the parts 13 of the posts 6, the said parts serving also as rests for the oscillatory cutting or shearing device when the machine is not in use, as will be clearly evident from an inspection of Figs. 2, 5 and 7 of the drawings.

I am aware that some changes may be made in the general arrangements and combinations of the various devices and parts, as well as in the details of the construction of the same, without departing from the scope of my present invention as described in the foregoing specification and as defined in the claims which are appended to the said specification. Hence I do not limit my present invention to the exact arrangements and combinations of the said devices and parts as described in the said specification, nor do I confine myself to the exact details of the construction of the said parts, as illustrated in the accompanying drawings.

I claim:—

1. A shearing or cutting machine comprising a base, a multiplicity of supporting bars upon which the sheet which is to be cut is adapted to be placed, a multiplicity of cutters corresponding to the number of supporting bars and moving in shearing-engagement with said bars, and a gage connected with said machine, the downward movement of said cutters being limited so that said cutters when at their lowest points will not pass entirely below the upper marginal surfaces of said supporting bars.

2. A shearing or cutting machine comprising a base, a multiplicity of supporting bars upon which the sheet which is to be cut is adapted to be placed, a multiplicity of oscillatory cutters corresponding to the number of supporting bars and moving in shearing-engagement with said bars, and a gage connected with said machine, the downward movement of said cutters being limited so that said cutters when at their lowest points will not pass entirely below the upper marginal surfaces of said supporting bars.

3. A shearing or cutting machine comprising a base, a multiplicity of posts at the rear and front of said base, supporting bars secured at their rear and front end-portions to said rear and front posts, respectively, cutters pivotally secured at their rear end-portions to said rear posts, and gages extending upwardly from some of said rear posts, the downward movement of said cutters being limited so that said cutters when at their lowest points will not pass entirely below the upper marginal surfaces of said supporting bars.

4. A shearing or cutting machine comprising a base, a multiplicity of posts at the rear and front of said base, supporting bars secured at their rear and front end-portions to said rear and front posts, respectively, cutters pivotally secured at their rear end-portions to said rear posts, a connecting bar connected with the front end-portions of said cutters, and gages extending upwardly from some of said rear posts, the downward movement of said cutters being limited so that said cutters when at their lowest points will not pass entirely below the upper marginal surfaces of said supporting bars.

5. A shearing or cutting machine comprising a base, a multiplicity of posts at the rear and front of said base, supporting bars secured at their rear and front end-portions to said rear and front posts, respectively, cutters pivotally secured at their rear end-portions to said rear posts, a front connecting bar, fingers extending rearwardly from said front-bar, means for securing each finger to the front end-portion of each cutter, a fingerpiece upon said front bar, and gages extending upwardly from some of said rear posts, the downward movement of said cutters being limited so that said cutters when at their lowest points will not pass entirely below the upper marginal surfaces of said supporting bars.

6. A shearing or cutting machine comprising a base, a multiplicity of posts at the rear and front of said base, said posts being provided upon their upper portions with cutaway parts forming off-sets, a pivot-pin connected with the upper end-portion of each rear post, supporting-bars having their rear and front end-portions fitted upon the off-sets of said rear and front posts, a cutter mounted at its rear end-portion upon each pivot-pin, and gages extending upwardly from some of said rear posts, the downward movement of said cutters being limited so that said cutters when at their lowest points will not pass entirely below the upper marginal surfaces of said supporting bars.

7. A shearing or cutting machine comprising a base, a multiplicity of posts at the rear and front of said base, said posts being provided upon their upper portions with a cut-away part forming off-sets, a pivot-pin connected with the upper end-portion of each rear post, supporting-bars having their rear and front end-portions fitted upon the off-sets of said rear and front posts, a cutter mounted at its rear end-portion upon each pivot-pin, a connecting bar connected with the front end-portions of said cutters, and gages extending upwardly from some of said rear posts, the downward movement of said cutters being limited so that said cutters when at their lowest points will not pass entirely below the upper marginal surfaces of said supporting bars.

8. A shearing or cutting machine comprising a base, a multiplicity of posts at the rear and front of said base, said posts being provided upon their upper portions with a cut-away part forming off-sets, a pivot-pin connected with the upper end-portion of each rear post, supporting-bars having their rear and front end-portions fitted upon the off-sets of said rear and front posts, a cutter mounted at its rear end-portion upon each pivot-pin, a front connecting bar, fingers extending rearwardly from said front-bar, means for securing each finger to the front end-portion of each cutter, a finger-piece upon said front bar, and gages extending upwardly from some of said rear posts.

In testimony, that I claim the invention set forth above I have hereunto set my hand this sixth day of February, 1909.

JOHN I. COLLEY.

Witnesses:
GEO. B. SPANGENBERG,
CHAS. KOCHER.